United States Patent [19]

Welch

[11] Patent Number: 5,115,668
[45] Date of Patent: May 26, 1992

[54] NON-INVASIVE PRESSURE MEASURING DEVICE AND METHOD

[75] Inventor: Jeanne A. Welch, Laurel, Md.

[73] Assignee: The United States of America as represented by the Secretary of the Navy, Washington, D.C.

[21] Appl. No.: 620,108

[22] Filed: Nov. 30, 1990

[51] Int. Cl.⁵ ............................................. G01M 3/40
[52] U.S. Cl. .......................................... 73/52; 73/705; 324/460
[58] Field of Search ..................... 73/52, 49.3, 705; 324/460

[56] References Cited

U.S. PATENT DOCUMENTS

| | | | |
|---|---|---|---|
| 2,370,475 | 2/1945 | Lemmers | 324/460 |
| 2,725,525 | 11/1955 | Rively et al. | 324/460 |
| 4,147,431 | 4/1979 | Mann | 73/705 X |
| 4,452,071 | 6/1984 | Eesley et al. | 73/705 X |
| 4,939,926 | 7/1990 | Welch | 73/49.3 |

FOREIGN PATENT DOCUMENTS

| | | | |
|---|---|---|---|
| 1420423 | 8/1988 | U.S.S.R. | 73/52 |
| 1013818 | 12/1965 | United Kingdom | 324/460 |

*Primary Examiner*—Hezron E. Williams
*Assistant Examiner*—Joseph W. Roskos
*Attorney, Agent, or Firm*—Thomas E. McDonnell; George Jameson

[57] ABSTRACT

A low pressure, low energy measuring device for indirectly and non-invasively measuring the pressure of a gaseous medium in a sealed system, such as gas discharge lamp, is disclosed. The measuring device and method measures the luminance of an externally-induced, high-frequency glow discharge of a gas in the lamp by non-invasive means. Comparison of the measured luminance with calibrated luminance vs. pressure data provides the pressure for the gas. In one embodiment, the components of the measuring device form a stand-alone unit useful for testing multiple sealed systems. In another embodiment, certain components of the device are integrated into the lamp's discharge system to facilitate measurement in the field. A separate peripheral unit is required with this latter embodiment.

25 Claims, 2 Drawing Sheets

NON-INVASIVE PRESSURE MEASURING DEVICE AND METHOD

BACKGROUND OF THE INVENTION

1. Field of the Invention

The invention relates generally to measuring devices and to devices for measuring the pressure in a sealed container. More particularly, the invention relates to a non-invasive device and method for measuring the pressure of a gas in a double-envelope lamp.

2. Prior Art

An infrared gaseous discharge lamp of integrated double-envelope construction has an inner chamber or envelope filled with a gaseous medium under relatively high pressure which provides illumination when the lamp is energized. The outer chamber or envelope is normally evacuated or otherwise provided with a relatively low-pressure gas.

Double-envelope lamps are subject to gas leaks from the inner chamber to the outer chamber. Eventually, these leaks may lead to catastrophic lamp failure by a mechanism that involves electric arcing in the outer chamber. A device that will measure the leakage of gas to the outer chamber is necessary to determine the operational status of the lamp and to predict the storage and operating lifetimes.

Under field conditions, standard vacuum measuring devices, such as thermocouples and ionization gauges, are not suitable for lamp pressure determination because they interfere with or permanently damage the operating system. For example, integrated invasive vacuum gauges such as ionization gauges will interfere with the gas dynamics and/or complicate the engineering of the lamp's operating system. Use of a stand-alone invasive measuring device results in damage to the lamp.

The above conditions are true in glow discharge lamp systems, especially systems with a double-envelope design. A simple modification of the lamp to allow for pressure measurement is not possible. Yet, the lamp is subject to gas leaks from the inner chamber to the outer chamber, resulting in damage as noted above.

Non-invasive means are known in the prior art for measuring the pressure within a closed container. For example, a short burst of high-voltage rf power and a flash of high intensity light are employed in Pfaff et al. (U.S. Pat. No. 4,546,319) to test the vacuum in a vial, causing an ion current, the amplitude of which is indicative of pressure. Pfaff et al. indicate that in the known prior art, evacuated vials were tested by a sustained application of high voltage to ionize the gas therein, and determining the degree of vacuum by the color of the ionized gas.

In Tittmann et al. (U.S. Pat. No. 4,869,097), the pressure of the gas in a sealed vessel is measured by applying frequency-swept sonic energy to the vessel, the resonant frequency being noted to determine pressure. Eesley et al. (U.S. Pat. No. 4,452,071) uses sonic energy to measure pressure in a halogen-filled lamp, by measuring the speed of a shock wave within the lamp.

Fukushima (U.S. Pat. No. 4,402,224) tests the vacuum pressure of an evacuated electrical device which emits an electrical field, the strength of which varies with internal pressure. This field is converted to polarized light and a measurement made to determine pressure. Internal pressure in a vessel is measured in Shibasaki (U.S. Pat. No. 4,313,171) by electromagnetic inductive sensing of physical characteristics of the vessel surface.

However, the inventor is not aware of any means for the non-invasive measurement of the internal pressure of a double-envelope glow discharge lamp.

The non-invasive pressure measuring device of the present invention is based on the pressure dependence of the luminance of a gas discharge when the gas is under low pressure. For the double-envelope construction lamp, if gas from the inner chamber has leaked into the outer chamber, and this gas in the outer chamber is energized, the luminance of the gas in the outer chamber is proportional to the actual pressure in the outer chamber. For a fixed-geometry container and radio frequency (rf) voltage, the positive column discharge is uniform, and the light distribution is unchanged. The intensity of the luminous glow discharge is known to be directly proportional to the pressure of the gas at low pressures, where the discharge and gas behave ideally. Thus, measuring the luminance of a gas discharge as a function of pressure for a fixed electrode separation yields a specific calibration curve. An absolute reference is established with the measurement of a known pressure of the gas in question. Comparison of the measured signals to the calibrated luminance yields a pressure.

Measurement of the luminance of a high frequency, rf glow discharge is a new approach to pressure determination. Luminance measurements are of limited sensitivity, but the sensitivity is adequate for detecting the failure pressure of a double-envelope lamp. With only the outer chamber pressure of interest in detecting the failure of a double-envelope discharge lamp, using an rf discharge to facilitate detection in a sealed system is advantageous because it can be limited to measure only the outer envelope through the electrode placement and operation. This rf discharge can be maintained at pressures lower than those required for a dc discharge, extending the dynamic range of the measuring device.

SUMMARY OF THE INVENTION

Accordingly, it is an object of the present invention to provide a device for measuring the pressure within a sealed container.

Another object of the invention is to provide a device of the foregoing type which measures the internal pressure of a transparent or semi-transparent sealed container.

Another object of the invention is to provide a device of the foregoing type having a gas in the sealed container which can be induced to provide radiation.

Another object of the invention is to provide a device of the foregoing type based upon the pressure-dependent luminance of the radiation produced by the gas within the container.

Another object of the invention is to provide a device of the foregoing type which is non-invasive of the container.

A further object of the invention is to provide a device of the foregoing type which can selectively measure the pressure of a gas in a multiple chamber sealed container.

Another object of the invention is to provide a method for non-invasively measuring the pressure within a sealed container in accordance with the foregoing objects.

These and other objects of the invention are attained in a non-invasive device and method for measuring the pressure within a double-envelope container, such as a double-envelope construction gas discharge lamp, based upon the pressure-dependent discharge luminance of the gas within the container. The device includes an rf excitation apparatus for inducing glow discharge of the gas in one envelope of the container, and means to sense and measure the luminance intensity. Comparison of the measured luminance with calibrated reference luminance vs. pressure data stored in a data processor provides the pressure for the gas. In one embodiment, the components of the measuring device form a stand-alone unit useful for testing multiple discharge lamps. In another embodiment, certain components of the device are integrated into the lamp's discharge system, and a common unit housing the remaining components of the device facilitates measurement and testing in the field without handling the lamp.

DESCRIPTION OF THE PREFERRED EMBODIMENTS

In the following description, the invention is described as applied to a gas discharge lamp of double-envelope construction wherein the pressure in the outer envelope or chamber is measured. However, the apparatus and methodology of the present invention can be applied to measure the pressure in any sealed container which permits transmission of the luminance.

Figure 1:
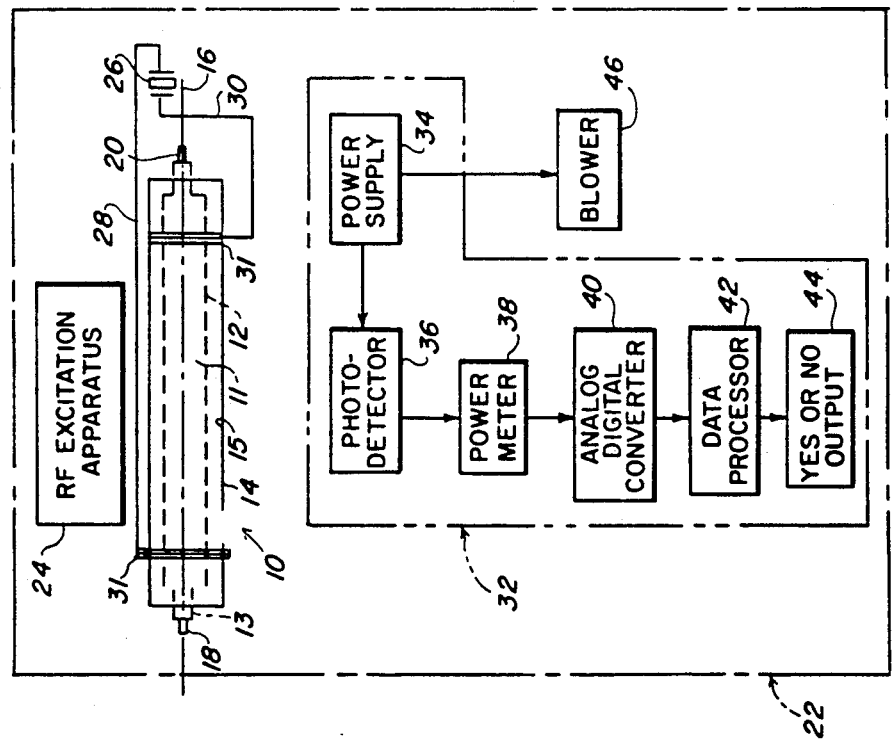
FIG. 1 is a schematic illustration of one embodiment of the pressure measuring device of the present invention.

Referring now to the drawings, a schematic of one embodiment of the pressure measuring device of the present invention is shown in FIG. 1 wherein a glow discharge lamp 10 to be tested, such as an infrared lamp, has an inner envelope 12 (shown in dotted lines) concentrically disposed within an outer, surrounding envelope 14, with both envelopes being arranged along a common axis 16. The inner envelope 12 defines an inner sealed chamber 11, and an outer sealed chamber 15 is defined between the two envelopes 12 and 14. The ends of both envelopes 12 and 14 are closed and are interconnected together, as generally indicated by the reference numeral 13, to provide a unitized lamp of solid, reliable and fully sealed construction. The opposed ends of the inner envelope are also provided with outwardly-extending electrodes 18 and 20 for connection to a suitable power source for use or testing of the lamp 10.

The inner chamber 11 of the lamp 10 is filled with a relatively high pressure gaseous medium which illuminates when the lamp is energized in use. The outer chamber 15 is preferably a vacuum or filled with a gaseous medium at relatively low pressure when the lamp is manufactured. After manufacture and prior to the initial use of the lamp 10, and especially after repeated use, it is important to check the pressure of the outer chamber 15 for leakage of gas from the inner chamber 11. If leakage occurs, detection is important; otherwise, an unpredicted catastrophic failure may occur as the result of electric arcing of the leaked gas between the envelopes 12 and 14 by means of the interconnecting electrodes.

The embodiment of the pressure measuring device 22 shown in FIG. 1 includes a high-frequency, rf excitation apparatus 24 which has an integral, tunable impedance matching network (not shown) of known construction. Although not shown, measuring device 22 is provided with suitable attachment means for selectively and quickly engaging the ends of the lamp 10 so that it is firmly held in a parallel and centered position relative to the measuring device while at the same time being quickly releasable therefrom when measuring or testing is completed or otherwise terminated, so that one or more lamps may be tested quickly and reliably.

Since the operating range of the rf excitation apparatus 24 normally does not provide low pressure energization, the measuring device 22 includes an initialization energy source which includes a piezoelectric starter switch 26 and separate leads 28 and 30 attached respectively to the rf energization electrodes 31, which can be ring electrodes conveniently placed around the lamp 10 during testing. The frequency of the rf excitation must be fixed for a series of tests, but the actual value is not critical. Any radiation in the 10-60 MHz range is generally adequate.

To measure the gaseous discharge luminance of the lamp 10 being tested, the measuring device 22 is provided with a luminance sensing and measuring subassembly 32 which includes a power supply 34, a photodetector 36 such as, e.g., a silicon photodiode, a power meter 38, an analog-to-digital (A/D) converter 40, and a data processor 42 which, for example, can be conveniently embodied as a minicomputer. The measured results from the data processor 42 can be used or displayed in any suitable manner. One example shown in FIG. 1 is a visual output indicator 44, such as a $\mp$Yes"/"No" indicator, to indicate acceptance or rejection of the tested lamp based upon whether the measured value of pressure is less than or greater than a predetermined threshold value.

If necessary, a blower 46 may be connected to the power supply 34 for ventilating and cooling the measuring device 22. The blower would be especially useful if numerous lamps are successively tested. Although not specifically shown in FIG. 1, the power supply is connected to the rf excitation apparatus 24 to provide the energizing source.

In use, the photodetector 36 is appropriately positioned in relation to the lamp 10 being tested. One of the advantages of the power meter 38 is that it provides an immediate indication of the power level of the luminance of the gaseous medium in the outer chamber 14 when energized during testing of the lamp 10.

In the operation of the pressure measuring device 22, the rf excitation apparatus 24 provides the glow discharge voltage to energize the gas in the outer chamber 15. This voltage is maximized for data collection. While the piezoelectric starter 26 is intended for use when the gas in the outer chamber 15 is at a pressure too low to be energized by the rf excitation apparatus 24, it may be more expedient to use the starter switch for every test, regardless of the gas pressure in the lamp 10. Otherwise, excitation of the gas in the outer chamber 15 can be attempted with the rf excitation apparatus 24, and if the gas pressure is too low, then the piezoelectric started switch 26 may be used.

The photodetector 36 measures the luminance of the glow discharge inside the outer chamber 15 and this information is indicated on the power meter 24 to provide a visual indication of this value. The luminance signal from the photodetector 36 is processed through the A/D converter 40 and the data processor 42. Data for known calibration or reference curves (for the known gases commonly used in gas discharge lamps), and for different lamp configurations, are stored in the data processor 40, and the appropriate calibration curve is selected in the data processor prior to the test. The pressure in the outer chamber 15 is computed by comparing the luminance data from the photodetector 36 with the selected, known calibration curve, and the integrity of the lamp assessed and indicated on the output indicator 44.

Although not shown in the drawings, the measured luminance data from the photodetector 36 and the calculated pressure from the data processor 42 can be displayed on a monitor and/or a printer. This information can also be stored for other uses.

A reference or calibration of pressure and luminance is established with the measurement of a known pressure of the type of gas in question. A sealed glass reference tube of known pressure for the gas of interest is used to obtain the pressure-luminance calibration curve. The dimensions of the reference glass tube will be identical to those of the lamp to be tested. Pressure vs. luminance data for different gases, different pressures and different lamp and electrode configurations are stored in the data processor 42.

Figure 2:
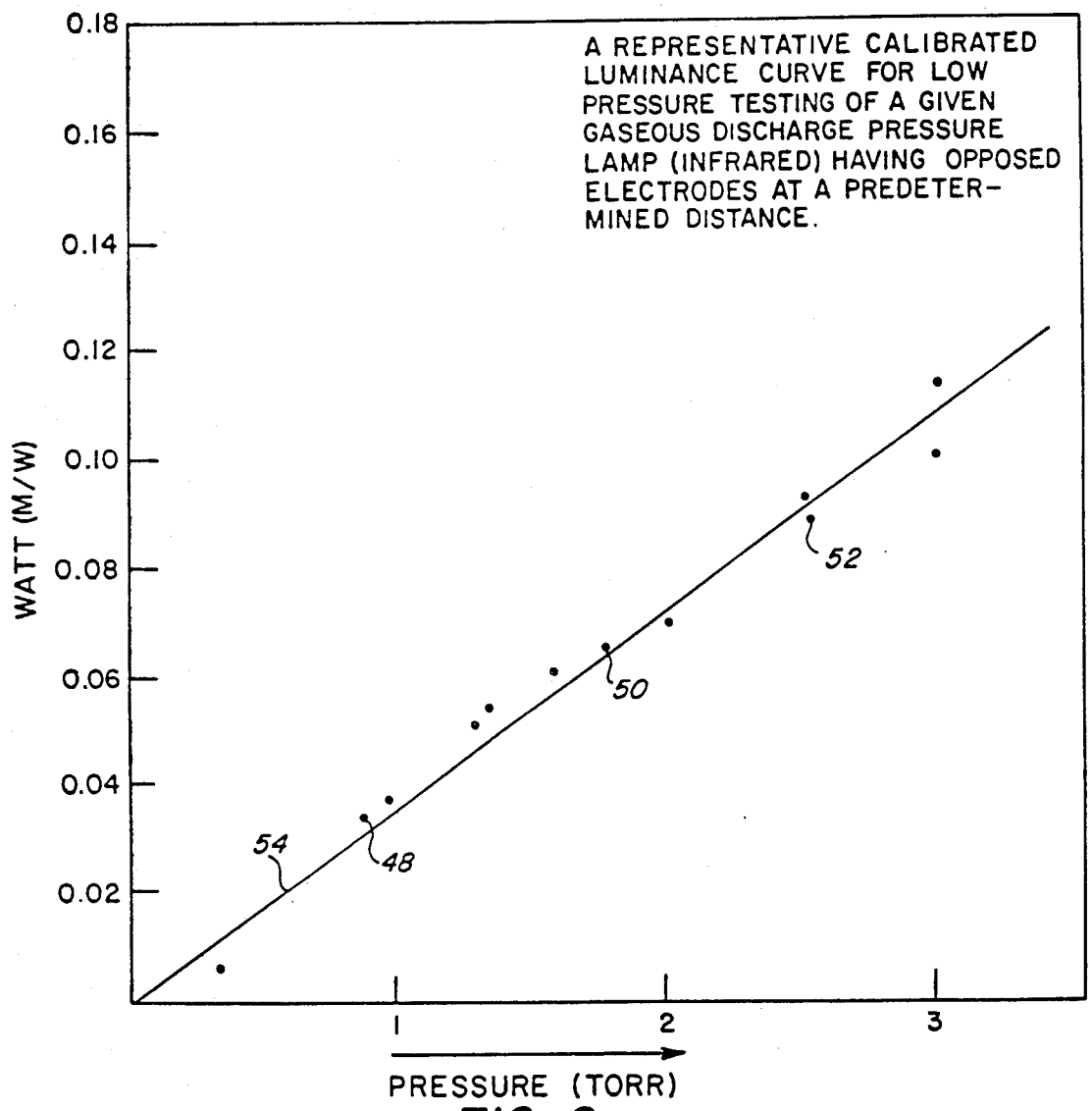
FIG. 2 is a representative luminance calibration curve.

As illustrated in FIG. 2, the outer envelope of a standardized reference and representative lamp for one or more given lamps to be tested, is tested at various low pressures (in Torr units) and with relatively low power levels (in milliwatts). The purpose of this reference lamp test is to determine a series of data points, such as points 48, 50, 52, etc., thereby enabling determination of a calibration curve or line 54 for a given lamp and gas to be tested. The calibration line 54 can be readily stored or otherwise programmed in the data processor 42, to enable comparison of the measured luminance values with such reference curve, to permit assessment of the pressure condition of the outer envelope 14 of the tested lamp.

The calibration line 54 provides the threshold values by which the output indicator 44 is energized "Yes" or "No" with regard to the acceptability of the measured pressure condition. Accordingly, any lamp being tested which provides a luminance that falls below a specified failure point on the calibration line 54 may be indicated as acceptable since it would have an acceptably-low pressure in the outer chamber 15. This condition would indicate no leakage, or an acceptably low level of leakage, of gas into the outer chamber 15. Conversely, any lamp which provides a luminance output at a power level that is greater than the failure point on the calibration line 54 is then rejected.

The embodiment of the pressure measuring device 22 illustrated in FIG. 1 is particularly useful for certain applications, such as at assembly and storage facilities, where numerous lamps of the same type or large numbers of different-type lamps can be readily tested. All components of the pressure measuring device 22 are self-contained, and the lamp to be tested merely has to be inserted into the device. However, in the field it may be disadvantageous to have to disassemble the lamp's discharge system and remove the lamp for each test. A convenient alternative would be a measuring device in which some of the less costly components can be integrated directly into the lamp's discharge system without significantly altering the operation of the lamp.

Such an "integrated" system would allow pressure measurements to be made without handling the lamp or removing it from service.

Figure 3:
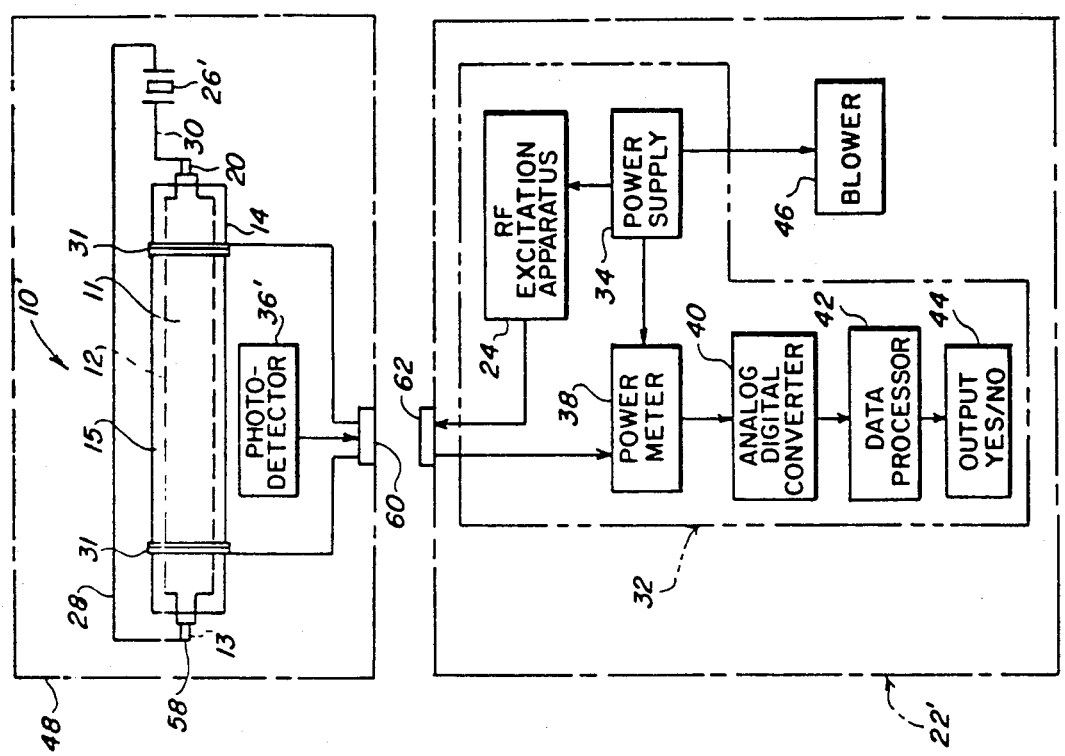
FIG. 3 is a schematic illustration of another embodiment of the pressure measuring device of the present invention.

Such an embodiment of the measuring device 22' is shown in FIG. 3, wherein some components of the measuring device are integrated into the housing of the lamp. Then, a single peripheral unit for sensing and measuring the luminance can be used to test multiple, installed lamps. This embodiment is particularly applicable with new-construction lamp installations, where the components can be integrated into the lamp housing at the time of construction. Alternatively, existing lamp housing can be modified to accept the components. In either situation, the lamp itself is not modified.

As shown in FIG. 3, the piezoelectric starter switch 26' and the photodetector 36' are integrated into the energization circuit of the lamp 10', and may be physically incorporated into the lamp housing 58 for the lamp. The other components of the measuring device 22 described relative to FIG. 1 remain unchanged, and are incorporated into the modified measuring device 22' which would be compact in size and portable. These components include the rf excitation apparatus 24, power supply 34, power meter 38, the A/D converter 40, data processor 42, output indicator 44 and blower 46, which function in the same way as described for FIG. 1.

Complemental connectors 60 and 62 on the lamp housing 58 and the pressure measuring device 22', respectively, permits electrical coupling of the portable pressure measuring device 22' with the lamp housing 58 to effect rapid pressure measurements.

The embodiment of FIG. 3 allows in situ pressure measurement of a discharge lamp or other sealed system, allowing the lamp to be tested without removing it from service. This significantly reduces the amount of handling, minimizing the possibility of damage to the lamp, the housing, or the discharge system. One measuring device 22' can be used to test multiple lamps, either of the same type or other types, by selection of the appropriate calibration curve in the data processor 42.

In the embodiment of FIG. 3, the components which will be integrated into the lamp housing will depend on the particular discharge system. Desirably, these will be the less costly components.

Since only the pressure in the outer chamber is of interest in the double-envelope lamp application, an rf discharge is used to establish the luminance. This discharge can be localized to measure a specific location in the lamp. Relative pressure changes in the inner chamber generally are too small to be accurately measured.

The pressure measuring device of the present invention is composed entirely of off-the-shelf, mature technology, and the design is simple and inexpensive. The design relies on the luminance of a gas discharge to determine the pressure in a sealed system, and is comprised of two essential components: a discharge source and a detector. Because of this basic design, it can be altered extensively to match the particular circumstances of the lamp system to be tested. These modifications can include different electrode configurations, photodetectors, and luminance detection and measuring subsystems. For instance, the choice of photodetector will be dictated by the gas used in the lamp. Also, excitation with a dc (direct current) discharge rather than an rf discharge is possible, and in some applications may be required.

The power meter 38 is optional, and is not critical to the operation of the measuring device 22 or 22'. Its use provides a quick visual indication of the luminance level, independent of the type of information displayed on the output indicator 44. In addition to providing a "Yes/No" type indication, or an actual pressure value, the measured luminance can be used to provide other types of information, such as the projected remaining life of the lamp before leakage may result in a failure.

The lower limit of pressure which can be measured is limited only by the available power level to energize the rf excitation apparatus. Lower pressures can be reliably measured with greater energizing power levels. Also, as noted before, the invention is not limited to measuring the pressure in a double-envelope lamp. It can be used to measure the pressure in any sealed container in which a glow discharge can be induced and the resulting luminance sensed.

Among the many advantages of the present invention is that once the measuring device is calibrated for any given lamp, reliable tests of one or more lamps of the same type can be performed without affecting either the lamp structure or the lamp operation in any way. Further, since the device operates at low power levels, safety to the operating personnel is assured, even if the lamp being tested is faulty. Due to the versatility of the measuring device, it can be quickly recalibrated to test different types of lamps. Because of the simplicity and the ease of operation, the device can be used with minimal training.

It is understood that many other changes and additional modifications are possible in view of the teachings herein without departing from the scope of the invention as defined in the appended claims.

I claim:

1. A device for non-invasively measuring the pressure in a closed container having a gas which can be energized to radiation, the closed container being transparent to the radiation, the device comprising:
   means for inducing glow radiation of the gas in said closed container;
   means for measuring the luminance level of said radiation of the gas; and
   data processing means for comparing the luminance level from said measuring means with reference data of pressure versus luminance, and providing an output of corresponding pressure, said data processing means being provided with a plurality of reference mathematical relationships of pressure versus luminance for a sealed container dimensionally identical to the closed container being measured and for the same type of gas.

2. A device as defined in claim 1, wherein said means for inducing glow radiation of the gas in the closed container is a radio frequency excitation apparatus.

3. A device as defined in claim 2, wherein said means for inducing glow radiation of the gas in the closed container further includes a piezoelectric starter.

4. A device as defined in claim 3, wherein said means for measuring the luminance level of radiation includes a photodetector and an analog-to-digital converter.

5. A device as defined in claim 4, further comprising a sensing means for providing an indication of the luminance level of the glow radiation.

6. A device as defined in claim 1, wherein said means for measuring the luminance level of radiation includes a photodetector and an analog-to-digital converter.

7. A device as defined in claim 1, wherein said data processing means is provided with reference mathematical relationships of pressure versus luminance for gases different from the gas in the closed container being measured.

8. A device as defined in claim 7, wherein said data processing means is further provided with reference mathematical relationships of pressure versus luminance for sealed containers dimensionally different from the closed container being measured.

9. A device as defined in claim 8, wherein:
   said means for inducing glow radiation of the gas in the closed container is a radio frequency excitation apparatus; and
   said means for measuring the luminance level of radiation includes a photodetector and an analog-to-digital converter; and
   further comprising a sensing means for providing an indication of the luminance level of the glow radiation.

10. A device as defined in claim 9, wherein said means for inducing glow radiation of the gas in the closed container further includes a piezoelectric starter.

11. A device as defined in claim 10, wherein said closed container comprises a lamp.

12. A device as defined in claim 10, wherein said closed container comprises the outer envelope of a double-envelope type lamp.

13. A device as defined in claim 10, wherein said photodetector and piezoelectric starter are integrally associated with said closed container, separate from the other components of the pressure measuring device, and said other components comprise a measuring subassembly which can be operatively coupled to different sealed containers.

14. A device as defined in claim 10, wherein said closed container comprises a lamp adapted to be installed in a housing, and said photodetector and piezoelectric starter are disposed in the lamp housing, separate from the other components of the pressure measuring device, and said other components comprise a measuring subassembly which can be operatively coupled to different housings.

15. A device as defined in claim 14, wherein said closed container comprises the outer envelope of a double-envelope type lamp adapted to be installed in said housing.

16. A device as defined in claim 9, wherein said closed container is adapted to be operatively coupled to said device and to be removed after the pressure in the closed container has been measured.

17. A method for non-invasively measuring the pressure in a closed container having a gas which can be energized to radiation, the closed container being transparent to the radiation, which comprises:
   inducing glow radiation of the gas in the closed container;
   measuring the luminance level of the radiation of the gas;
   comparing the measured luminance level with reference mathematical relationships of pressure versus luminance for a sealed container dimensionally identical to the closed container being measured and for the same type of gas; and
   providing an output of the pressure corresponding to the measured luminance level.

18. A method as defined in claim 17, wherein glow radiation of the gas is induced by radio frequency excitation.

19. A method as defined in claim 18, wherein the radio frequency is high-frequency excitation.

20. A method as defined in claim 18, wherein the luminance level is measured with a photodetector and a converter for providing a digital representation of the luminance level.

21. A method as defined in claim 20, wherein the measured luminance level is compared with reference mathematical relationships of pressure versus luminance for gases different from the gas in the closed container being measured.

22. A method as defined in claim 21, wherein the measured luminance level is compared with reference mathematical relationships of pressure versus luminance for sealed containers dimensionally different from the closed container being measured.

23. A method as defined in claim 22, wherein the measured luminance level is compared in a data processor provided with reference mathematical relationships of pressure versus luminance for gases different from the gas being measured and for sealed containers dimensionally different from the closed container being measured.

24. A method as defined in claim 23, wherein said closed container comprises a lamp adapted to be installed in a housing.

25. A method as defined in claim 24, wherein said closed container comprises the outer envelope of a double-envelope type lamp adapted to be installed in said housing.

* * * * *